(12) United States Patent
Michioka et al.

(10) Patent No.: US 6,705,430 B2
(45) Date of Patent: Mar. 16, 2004

(54) DUST PREVENTING STRUCTURE OF GUIDE UNIT

(75) Inventors: Hidekazu Michioka, Tokyo (JP); Yoshiaki Saitou, Yamanashi-ken (JP); Yasuhide Katsumata, Yamanashi-ken (JP); Mitsuaki Honma, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/144,390

(22) Filed: May 14, 2002

(65) Prior Publication Data

US 2002/0134622 A1 Sep. 26, 2002

Related U.S. Application Data

(63) Continuation of application No. 09/450,249, filed on Nov. 29, 1999.

(30) Foreign Application Priority Data

Dec. 4, 1998 (JP) .......................................... 10-345325
Sep. 21, 1999 (JP) .......................................... 11/267212

(51) Int. Cl.$^7$ .............................................. F16C 17/00
(52) U.S. Cl. ........................................................ 184/5
(58) Field of Search ............................... 184/5, 16, 22, 184/100; 384/13, 45

(56) References Cited

U.S. PATENT DOCUMENTS

| 1,102,641 | A | 7/1914 | Berger |
| 1,233,902 | A | 7/1917 | O'Conner |
| 1,928,448 | A | 9/1933 | Fox |
| 2,011,717 | A | 8/1935 | Johnson |
| 2,984,317 | A | 5/1961 | Russo |

(List continued on next page.)

FOREIGN PATENT DOCUMENTS

JP    1096240 A    4/1998

OTHER PUBLICATIONS

Abstract of Japanese Patent Publ. No. 0406216; dated Feb. 17, 1992.
Abstract of Japanese Patent Publ. No. 06307442; dated Nov. 1, 1994.
Abstract of Japanese Patent Publ. No. 07035146; dated Feb. 3, 1995.
Abstract of Japanese Patent Publ. No. 08200362; dated Aug. 6, 1996.
Abstract of Japanese Patent Publ. No. 08247144; dated Sep. 24, 1996.
Abstract of Japanese Patent Publ. No. 08247145; dated Sep. 24, 1996.

(List continued on next page.)

*Primary Examiner*—Chong H. Kim
(74) *Attorney, Agent, or Firm*—Arent Fox Kintner Plotkin & Kahn, PLLC (57) ABSTRACT

This invention relates to a dust preventing structure of a guide unit comprising a track shaft and a sliding member engaging the track shaft via a plurality of rolling bodies such that it is capable of reciprocating in a length direction thereof. Elastic members in firm contact with the track shaft are overlaid in the length direction of the track shaft. A lubricant pocket forming member having a concave groove portion for forming a lubricant pocket constituted of the elastic members and filled with lubricant by a help of the surface of the track shaft as well is provided so as to achieve a smooth reciprocating motion of the sliding member with respect to the track shaft with less sliding friction. Particularly, under even a severe use condition in which use of coolant is required or dust, dirt, wooden pieces, cutting powder or the like falls on the guide unit, a smooth reciprocating motion of the sliding member with respect to the track shaft can be maintained in a long period.

5 Claims, 6 Drawing Sheets

U.S. PATENT DOCUMENTS

| | | | |
|---|---|---|---|
| 3,985,404 A | 10/1976 | Plaza et al. |
| 4,005,913 A | 2/1977 | Thomson, Jr. |
| 4,426,090 A | 1/1984 | Bender |
| 5,480,161 A | 1/1996 | Borowski |
| 5,492,413 A | 2/1996 | Tsukada |
| 5,634,722 A | 6/1997 | Yuasa et al. |
| 5,769,543 A | 6/1998 | Tsukada et al. |
| 5,772,333 A | 6/1998 | Yabe et al. |
| 6,024,490 A | 2/2000 | Shirai |
| 6,082,899 A | 7/2000 | Suzuki et al. |
| 6,098,755 A | 8/2000 | Wyssmann |
| 6,098,756 A | 8/2000 | Shigetomi et al. |
| 6,106,154 A | 8/2000 | Agari |
| 6,123,457 A | 9/2000 | Suzuki et al. |
| 6,155,717 A | 12/2000 | Michioka et al. |

OTHER PUBLICATIONS

Abstract of Japanese Patent Publ. No. 08270661; dated Oct. 15, 1996.

Abstract of Japanese Patent Publ. No. 08326748; dated Dec. 10, 1996.

Abstract of Japanese Patent Publ. No. 09025933; dated Jan. 28, 1997.

Abstract of Japanese Patent Publ. No. 09042284; dated Feb. 10 1997.

Abstract of Japanese Patent Publ. No. 09042287, dated Feb. 10, 1997.

Abstract of Japanese Patent Publ. No. 09112551; dated May 2, 1997.

Abstract of Japanese Patent Publ. No. 09112552; dated May 2, 1997.

Abstract of Japanese Patent Publ. No. 09126235; dated May 13, 1997.

Abstract of Japanese Patent Publ. No. 10153216; dated Jun. 9, 1998.

English language translation of JP 10–96420A

DUST PREVENTING STRUCTURE OF GUIDE UNIT

This is a Continuation of application Ser. No. 09/450,249 filed Nov. 29, 1999. The disclosure of the prior application(s) is hereby incorporated by reference herein in its entirety.

BACKGROUND OF THE INVENTION

The present invention relates to a guide unit in which a track shaft and a sliding member are engaged with each other such that they are capable of relatively reciprocating via rolling bodies such as balls or rollers of ball bearing, ball bushing, ball screw, ball spline, roller bearing or the like for linear sliding and curved sliding, and more particularly to a dust preventing structure of a guide unit for removing foreign matter adhering to the surface of the track shaft and applying lubricating performance between the track shaft and sliding member.

This kind of the guide units are used in various fields requiring a linear motion, rotary motion, a curved motion and the like and their use conditions are diversified. For example, a guide unit of linear sliding type ball bearing for use in semiconductor manufacturing apparatus is used under a very clean environment, a guide unit of machine tool is used under an environment in which coolant is used and further, a guide unit of timber processing unit is used under a condition in which dust, dirt, wooden pieces, cutting powder and the like falls thereon.

In such a guide unit, if foreign matter such as coolant and dust invades into a gap between the track shaft and sliding member, the coolant repels lubricant or foreign matter absorbs lubricant, so that lubricity between the track shaft and sliding member drops considerably. As a result, rolling bodies such as balls or rollers bearing a load between the track shaft and sliding member or the track shaft in which the rolling bodies roll and the rolling groove in the sliding member side are worn abnormally thereby the service life of the unit dropping remarkably.

Thus, in a conventional linear sliding motion ball bearing comprising a track rail (track shaft) in which a ball rolling groove is formed in the length direction thereof and a sliding base (sliding member) in which a ball infinite circulation path constituted of a load rolling groove opposing the ball rolling groove in the aforementioned track rail via a plurality of balls, a direction changing path disposed at beginning and terminal ends of the load rolling groove and a ball return path connecting these direction changing paths is formed, sealing members made of rubber or the like are attached to both ends in the traveling direction of the sliding base so that they are in firm contact with the track rail, thereby removing coolant, dust and the like adhering to the surface of the track rail in the accordance the movement of the sliding base to prevent them from invading into the interior of the sliding base.

In case where, in this kind of the guide unit, foreign matter such as welding spatter or the like adheres to the track rail, if the aforementioned sealing member makes contact with the spatter, it may be caught thereby and damaged. To avoid such an inconvenience, according to another known structure of the guide unit, a scraper member made of metal or the like is attached outside of the sealing member of the sliding base with a slight gap with respect to the track rail, so that the foreign matter such as welding spatter adhering to the track rail is scraped out by this scraper member before the sealing member comes into contact with the spatter.

Because this kind of the sealing member keeps a firm contact with the track shaft (track rail in the previous example), lubricant such as lubricating oil and grease supplied inside the sliding member (sliding base in the previous example) and adhering to the surface of the track shaft is wiped off by a sealing member at the rear side of the sliding member in the advancement direction so as to prevent the lubricant from leaking out of the sliding member (lubricant leakage preventing function).

This lubricant leakage preventing function of this sealing member exerts an effect of using lubricant supplied inside the sliding member effectively. If an attention is paid to a sealing member located at the front side in the advancement direction when the sliding member reciprocates, it comes that this sealing member moves with a firm contact with the surface of the track shaft after lubricant is wiped off, so that friction resistance increases as compared to the sealing member located at the rear side in the advancement direction. As a result, a smooth reciprocation of the sliding member is prevented and if a reciprocating stroke is extremely long, the sealing member located at the front side in the advancement direction may be damaged by a friction caused between the sealing member and the track shaft or the service life of the sealing member may be shortened extremely.

This problem occurs like a case in which a scraper member made of metal, plastics or the like is used with the sealing member. Although the scraper member is capable of removing a large foreign matter such as spatter, because it cannot be mounted in a firm contact with the surface of the track shaft, it is not capable of removing small dust or dirt and when the sliding member reciprocates, the sealing member located at the front side in the advancement direction comes into contact with the small dust or dirt, so that friction resistance increases thereby the service life being reduced.

If the guide unit is used under a condition in which use of coolant is required or under an environment in which dust, dirt, wooden pieces, cutting powder or the like falls, this problem is very conceivable because after the sealing member wipes off, a slight amount of lubricant remaining on the surface of the track shaft is washed off by those foreign matters or absorbed. This problem needs to be solved to accelerate maintenance free about lubricant in a guide unit for use under such a severe condition.

OBJECT AND SUMMARY OF THE INVENTION

Accordingly, the inventor of the present invention considered a solution of this problem earnestly. As a result, the inventor of the present invention has completed a dust preventing structure of a guide unit capable of achieving a smooth reciprocation with less friction resistance of the sliding member with respect to the track shaft, preventing foreign matter from invading inside of the sliding member even if use of the sealing member is omitted if it is not used under a severe environment and further maintaining a smooth reciprocation of the sliding member with respect to the track shaft in a long period even under a severe condition in which use of coolant is required or dust, dirt, wooden pieces, cutting powder or the like falls on the guide unit, by using the sealing member at the same time.

Therefore, an object of the present invention is to provide a dust preventing structure of a guide unit capable of achieving a smooth reciprocation of the sliding member with respect to the track shaft with less friction resistance.

Further, another object of the present invention is to provide a dust preventing structure of a guide unit capable of maintaining a smooth reciprocation of the sliding member with respect to the track shaft in a long period even under a severe condition in which use of coolant is required or dust, dirt, wooden pieces, cutting powder or the like falls on the guide unit.

To achieve the above object, according to an aspect of the invention, there is provided a dust preventing structure of a guide unit comprising a track shaft and a sliding member engaging the track shaft via a plurality of rolling bodies so that it is capable of reciprocating in a length direction thereof, wherein elastic members in firm contact with the track shaft are overlaid in the length direction of the track shaft.

Further, according to another aspect of the invention, there is provided a dust preventing structure of a guide unit comprising a track shaft and a sliding member engaging the track shaft via a plurality of rolling bodies so that it is capable of reciprocating in a length direction thereof, the dust preventing structure further comprising a lubricant pocket forming member having a concave groove portion made of elastic material for forming a lubricant pocket filled with lubricant together with the surface of the track shaft.

Then, according to a preferred embodiment of the present invention, there is provided a dust preventing structure of a guide unit comprising a track shaft and a sliding member engaging the track shaft via a plurality of rolling bodies so that it is capable of reciprocating in a length direction thereof, the dust preventing structure further comprising a lubricant pocket forming member made of elastic material, including a lubricant supplying portion which is in firm contact with the track shaft holding lubricant for supplying lubricant to the surface of the track shaft upon use and a concave groove portion for forming a lubricant pocket filled with lubricant together with the surface of the track shaft.

According to the present invention, basically, the aforementioned lubricant pocket forming member is made of elastic material and includes the lubricant supplying portion which is in firm contact with the track shaft holding lubricant for supplying lubricant to the surface of the track shaft upon use and the concave groove portion for forming the lubricant pocket to be filled with lubricant together with the surface of the track shaft. If the lubricant supplying portion made of elastic material is capable of coating the surface of the track shaft with lubricant loaded in the lubricant pocket, with some extent of stiffness and holding a sufficient amount of lubricant, this lubricant pocket forming member can be formed with only the elastic material for forming the lubricant supplying portion. In this case, the lubricant pocket forming member may be formed with a single component member having a single or plural stripes of the concave groove portions or may be formed with plural component members when a single or plural stripes of the concave groove portions are formed when they are combined.

However, if as lubricant to be loaded in the lubricant pocket, for example, grease or solid lubricant is used, coating resistance which is generated when each of these lubricants is applied to the surface of the track shaft increases, so that an elastic material capable of holding a sufficient amount of lubricant considering a durable period of the dust preventing structure of the present invention may not be capable of bearing this coating resistance. Preferably, this lubricant pocket forming member comprises a plurality of elastic members constituting the lubricant supplying portion holding lubricant and spacer members which are made of stiff material and sandwiched between the plural elastic members so as to form a single or plural stripes of concave groove portions with the elastic members.

The size and quantity of the concave groove portion formed in the lubricant pocket forming member are not restricted to any particular ones, requirement for the lubricant pocket is satisfied if at least one stripe of the concave groove portion is formed and a sufficient amount of lubricant can be loaded in the lubricant pocket formed by this concave groove portion and the surface of the track shaft considering the durable period of the dust preventing structure of the present invention. Further, this concave groove portion needs to extend over an entire range in the direction of an outside periphery in which the sliding member covers the track shaft, so that lubricant can be applied to a substantially entire range in which the sliding member covers the track shaft.

The elastic material for forming at least the lubricant supplying portion of the aforementioned lubricant pocket forming member is continuously foamed body such as a continuously foamed polyurethanefoam and sintered resin or fiber entangled body such as wool felt, having physical properties including a tensile strength of 30–50 kg/cm$^3$, degree of elongation of 300–500%, and impact resilience of 30–60% and made to absorb and hold lubricant after it is formed to a predetermined shape. If the elastic member is formed of rubber or synthetic resin, lubricant is mixed with the rubber or synthetic resin preliminarily and formed to a predetermined shape. Alternatively, lubricant is mixed with monomer at a stage where monomer is polymerized so as to produce rubber or synthetic resin and an obtained rubber or synthetic resin containing lubricant is formed to a predetermined shape. Meanwhile, in case where the aforementioned polyurethanefoam is soaked with lubricant, preferably, the lubricant should be 30–50 weight % in terms of weight ratio.

The lubricant to be loaded in the aforementioned lubricant pocket may be in any condition of fluid, solid or gelatinous as long as it has a lubricating performance and can be loaded in the lubricant pocket. Although fluid lubricant having a relatively low viscosity can be used, the lubricant is preferred to have a high viscosity of more than 200 cst because such a lubricant is not likely to leak out of the lubricant pocket or in the form of paste, solid state or gelatinous state. More specifically, grease, high viscosity lubricant, solid lubricant, or gelatinous or solid state wax, or the like can be mentioned. Particularly, grease is preferred because it forms a lubricant coating film having an excellent durability (that is, lubricant coating film having an excellent anti-coolant performance) under a condition in which coolant is used.

In case where the lubricant pocket forming member is composed of a plurality of the elastic members and spacer members, the same elastic members as those for forming the lubricant supplying portion can be used and the spacer members may be formed of metallic plate or synthetic resin plate. Preferably, the spacer member is made of a metallic plate such as stainless plate because its mechanical characteristic value is excellent.

Further, according to the present invention, it is preferable to provide a scraper member which holds the aforementioned lubricant pocket forming member by sandwiching it between the scraper member and the sliding member. This scraper member needs to have such a strength that it is never deformed or damaged when it removes foreign matter adhering to the surface of the track shaft such as welding spatter and it is attached to the sliding member with a slight gap with respect to the surface of the track shaft, for example, a gap of 0.05–0.3 mm.

Preferably, this scraper member is formed into a shape capable of covering substantially entirely the lubricant pocket forming member with both ends of the sliding member in the advancement direction and the surface of the track shaft so as to protect the lubricant pocket forming member having the lubricant supplying portion formed of the elastic material from an impact given from outside, and foreign matter such as coolant, dust, cutting powder and the like.

The dust preventing structure of the present invention having the lubricant pocket forming member is accommodated in various guide units in diversified patterns.

The guide unit to which the dust preventing structure of the present invention is applied basically comprises the track shaft and the sliding member engaging this track shaft via a plurality of the rolling bodies such that it is capable of reciprocating in the length direction thereof and this dust preventing structure is mounted on each of both ends of the sliding member of the guide unit in the advancement direction thereof.

The guide unit to which the dust preventing structure of the present invention is applicable includes not only the linear sliding type ball bearing comprising the track rail (track shaft) having the ball rolling grooves and the sliding base (sliding member) engaging the track rail via a plurality of balls such that it is capable of reciprocating in the length direction thereof and having an infinite circulation path for the balls, but also a ball screw comprising a screw shaft (track shaft) having a spiral ball rolling groove and a nut member (sliding member) engaging the screw shaft via a plurality of balls such that it is capable of reciprocating and having an infinite circulation path for the balls, curved sliding type ball bearing, ball bushing, ball spline and roller bearings for linear sliding and curved sliding and the like.

The sliding member of the guide unit to which the dust preventing structure of the present invention is mounted may be or may not be provided with a sealing member for sealing between inside and outside of this sliding member at both end portions in the advancement direction and this is selectable depending on use condition of the guide unit.

Although the lubricant supplying member is disposed as required between the sliding member and sealing member, the dust preventing structure of the present invention may be or may not be provided with that lubricant supplying member. This is also selectable depending on use condition of the guide unit.

Regardless of it that the sliding member of the guide unit is provided with the sealing member and the lubricant supplying member, the dust preventing structure of the present invention is disposed most outside of both ends in the advancement direction of the sliding member and the lubricant supplying portion of the lubricant pocket forming member slides in firm contact with the surface of the track shaft to remove relatively small foreign matter and further lubricant loaded in the lubricant pocket formed by the lubricant pocket forming member is applied to the surface of the track shaft.

In case where the aforementioned scraper member is disposed outside of the lubricant pocket forming member, this scraper member exerts a function of scraping out a relatively large foreign matter adhering to the surface of the track shaft ahead of the lubricant pocket forming member.

Thus, according to the dust preventing structure of the present invention, it is used with, for example, the sealing member and lubricant supplying member, and even if the guide unit is used under a severe condition in which use of coolant is required or dust, dirt, wooden pieces, cutting powder or the like falls thereon, it can remove foreign matter on the surface of the track shaft securely and apply lubricant to the surface of the track shaft to form lubricant coating film before the sealing member comes into contact with the surface of the track shaft or lubricant is supplied to the surface of the track shaft by the lubricant supplying member. As a result, such an event that the sealing member is damaged or supplied lubricant is repelled by foreign matter remaining on the surface of the track shaft, particularly coolant so that it is not supplied uniformly to the entire surface of the track shaft never occurs, so that a smooth reciprocation of the sliding member with respect to the track shaft can be maintained in a long period.

Of course, if the guide unit is not used under such a severe condition, the dust preventing structure of the present invention may be mounted directly on both ends in the advancement direction of the sliding member without using the sealing member or lubricant supplying member, thereby achieving two roles of removing foreign matter from the surface of the track shaft and supplying lubricant to the surface of the track shaft at the same time.

According to the present invention, it is possible to provide a dust preventing structure of a guide unit capable of not only achieving a smooth reciprocation of the sliding member with respect to the track shaft with less friction resistance but also maintaining a smooth reciprocation of the sliding member with respect to the track shaft in a long period even under a severe condition in which use of coolant is required or dust, dirt, wooden pieces, cutting powder falls on the guide unit.

DETAILED DESCRIPTION OF THE PREFERRED EMBODIMENTS

Hereinafter, the preferred embodiments of the present invention will be described in detail with reference to the accompanying drawings.

Figure 1:
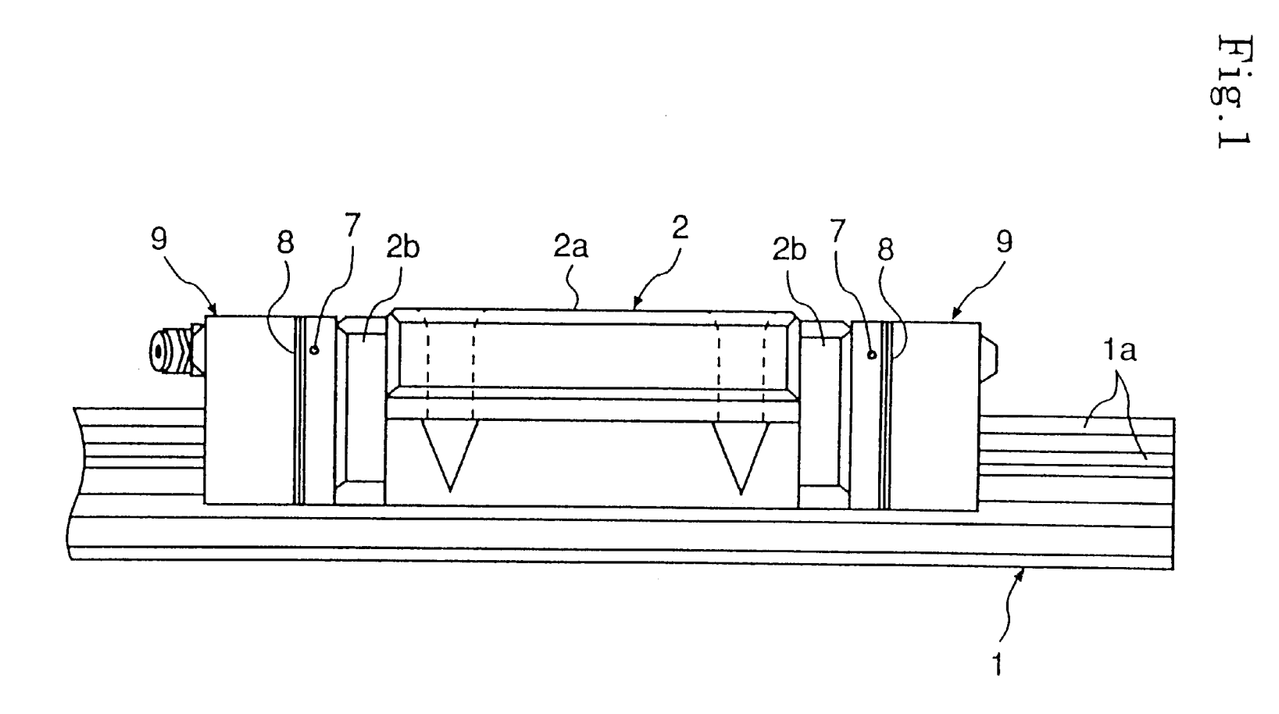
FIG. 1 is a side view showing a linear sliding ball bearing incorporating a dust preventing structure according to the embodiment of the present invention.
Figure 2:
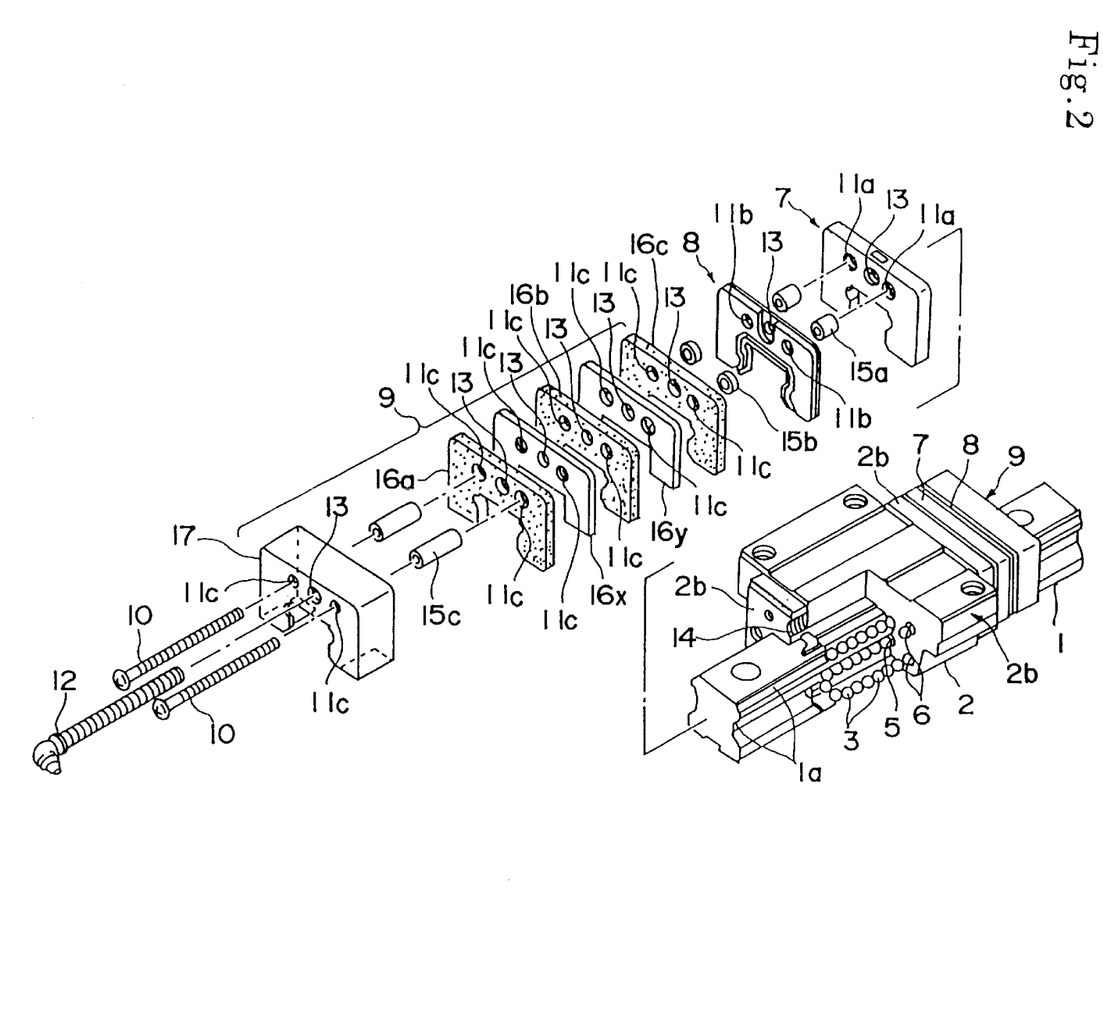
FIG. 2 is a disassembly perspective view of FIG. 1.

FIGS. 1, 2 show a ball bearing for linear sliding provided with a dust preventing structure according to the embodiment of the present invention.

This ball bearing for linear sliding comprises a track rail (track shaft) 1 in which a ball rolling groove 1a is formed in the length direction thereof and a sliding base (sliding member) 2 in which an infinite circulation path for balls 3 including a load rolling groove 5 opposing the ball rolling groove 1a in the aforementioned track rail 1 via a plurality of balls 3, direction changing paths (not shown) disposed at beginning and terminal ends of the load rolling groove 5 and a ball return path 6 for connecting between these direction changing paths is formed. Lubricant supplying members 7, end seal (sealing member) 8 and a dust preventing member 9 of the present invention are disposed on both end portions back and forth in the advancement direction of the sliding base 2.

The sliding base 2 comprises sliding base main body 2a composing a main body thereof and end plates 2b attached to both ends portions back and forth in the advancement direction. The load rolling path 5 and ball return path 6 which constitute the infinite circulation path for the balls 3 are formed in the sliding base main body 2a and the direction changing path constituting the infinite circulation path for the balls 3 is formed in the end plates 2b.

Mounting holes 11a, 11b, 11c through which a pair of fixing bolts 10 are inserted are formed in each top portion of the aforementioned lubricant supplying member 7, end seal 8 and dust preventing member 9. The lubricant supplying member 7, end seal 8 and dust preventing member 9 are mounted on each of both ends portions back and forth of the sliding base 2 in the advancement direction with the fixing bolts 10 which pass through the mounting holes 11a, 11b, 11c and engage the end plate 2b of the sliding base 2.

Reference numeral 12 denotes a supplying nipple for supplying lubricant or grease to the infinite circulation path for the balls 3 formed in the sliding base 2, the supplying nipple being inserted through holes 13 provided in the lubricant supplying member 7, end seal 8 and dust preventing member 9 and engaging a mounting hole 14 in the end plate 2b. Reference numerals 15a, 15b, 15c denote collars each having a dimension corresponding to thickness of the lubricant supplying member 7, end seal 8 and dust preventing member 9 so as to prevent the lubricant supplying member 7, end seal 8 and dust preventing member 9 from being crushed when the fixing bolts 10 are tightened firmly.

Figure 3:
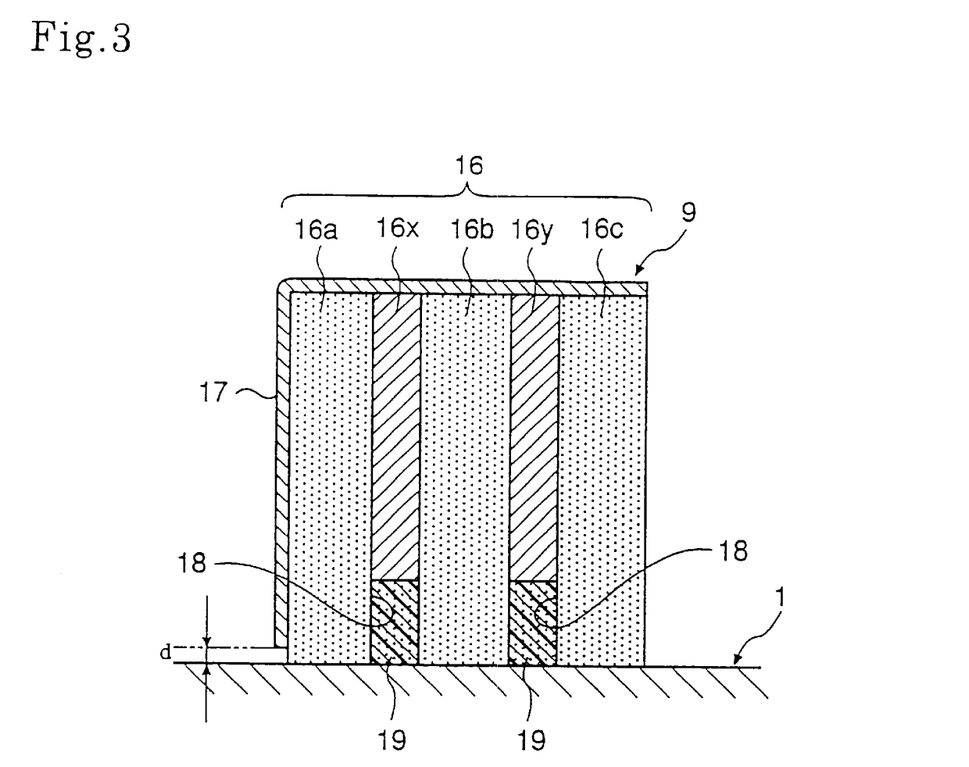
FIG. 3 is a sectional explanatory view showing the dust preventing member of FIGS. 1, 2.

The dust preventing member 9 of the present invention which is applied by this embodiment is made of continuously foamed urethanefoam as shown in FIGS. 2, 3, comprising lubricant pocket forming portion 16 including three elastic members 16a, 16b, 16c soaked cheld with lubricant for constituting the lubricant supplying portion and spacer members 16x, 16y made of metallic plates, which are interposed between the elastic members 16a, 16b, 16c for forming concave groove portion 18 with the elastic members 16a, 16b, 16c and a scraper member 17 made of metal plates, having a shape capable of covering a substantially entire lubricant pocket forming member 16 together with the both end portions back and forth (correspond to the end seal 8 mounted on both end portions back and forth in the advancement direction of the sliding base 2 in this embodiment) in the advancement direction of the sliding base 2 and the surface of the track rail 1, in other words, a shape capable of covering all surface substantially completely except faces of the lubricant pocket forming member 16 which contact the end seal 8 and track rail 1, the scraper member 17 being mounted on the sliding base 2 with a slight gapd (0.1 mm in this embodiment) relative to the track rail 1 while the lubricant pocket forming member 16 being sandwiched and held between the scraper member 17 and the sliding base 2 together with the lubricant supplying member 7 and end seal 8.

Meanwhile, the aforementioned scraper 17 may be formed of resin in the form of a case. In this case, it is recommendable to attach a metallic scraper for removing foreign matter on the track rail 1 on an outside face thereof.

An inside size (dimension in a plane perpendicular to the length direction of the track rail 1) of this case is set so as to be smaller than an outside size (size in the same plane) of each of the elastic members 16a, 16b, 16c. As a result, the respective elastic members 16a, 16b, 16c are fit within the case by tightening so that the outside peripheries of the elastic members 16a, 16b, 16c are fixed. By setting the inside size of the case appropriately, the tightening amount of the respective elastic members 16a, 16b, 16c can be adjusted. The size of the spacers 16x, 16y to be disposed between the elastic members 16a, 16b, 16c is set such that they are fit with the case with a gap because they are made of stiff material.

Although according to the above embodiment, the respective elastic members 16a, 16b, 16c are fit within the case by tightening, these elastic members 16a, 16b, 16c may be fit such that they are tightened by the track rail 1. In this case, preferably the above case has no gap with respect to the elastic members 16a, 16b, 16c.

Further, by forming the case of resin, the collars 15a, 15b, 15c for preventing the lubricant supplying member 7, end seal 8 and dust preventing member 9 from being crushed can be molded integrally with this case, thereby the number of parts being reduced.

Further, by extending this case such that it covers not only the respective elastic members 16x, 16b, 16c and spacers 16a, 16y but also the end seal 8 and lubricant supplying member 7 disposed backward thereof, the elastic members 16a, 16b, 16c, spacers 16x, 16y, end seal 8 and lubricant supplying member 7 can be molded integrally with the case, thereby assembly efficiency and appearance of the case being improved.

The sealed space lubricant pocket (corresponding to the concave groove portion 18) formed by the concave groove portion 18 formed in the lubricant pocket forming member 16 with the surface of the track rail 1 is filled with paste like grease 19.

According to this embodiment, the respective elastic members 16a, 16b, 16c made of continuously foamed urethanefoam have tensile strength of 43 kg/cm$^3$, elongation degree of 360%, density of 0.5 g/cm$^3$ and impact resilience of 53% and is soaked with lubricant of more than 50 weight %. Further, a supply possible period of the lubricant which is absorbed by these elastic members 16a, 16b, 16c and supplied to the track rail 1 is designed so as to be equal to a coating possible period of grease 19 which is loaded in the lubricant pocket (corresponds to the concave groove portion 18) and applied to the track rail 1.

Figure 4:
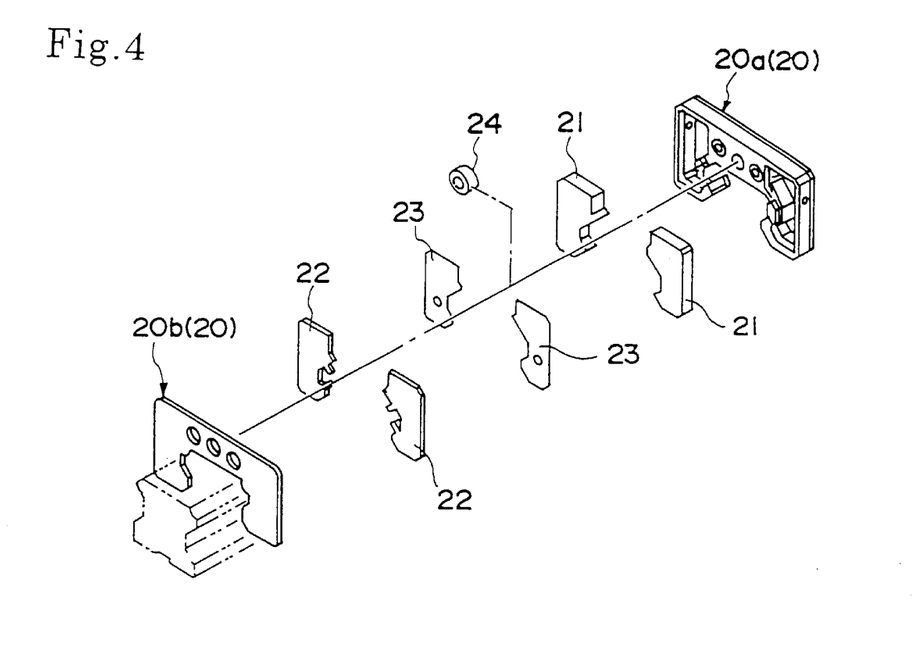
FIG. 4 is a disassembly perspective view showing the lubricant supplying member of FIGS. 1, 2.

As shown in FIG. 4, the lubricant supplying member 7 used in this embodiment comprises a casing 20 including a main body 20a and a lid portion 20b, an oil absorptive body 21 made of rayon mixed wool felt having a percentage of void of 81%, which is accommodated in the casing 20 and soaked with lubricant a coating body 22 made of wool felt having a percentage of void 54%, which receives lubricant from the oil absorptive body 21 for coating the ball rolling groove 1a the track rail 1 with lubricant and an oil amount adjusting plate 23 which partitions between the oil absorptive body 21 and coating body 22 for supplying lubricant of a predetermined amount from the oil absorptive body 21 to the coating body 22. Reference numeral 24 denotes a collar.

Figure 5:
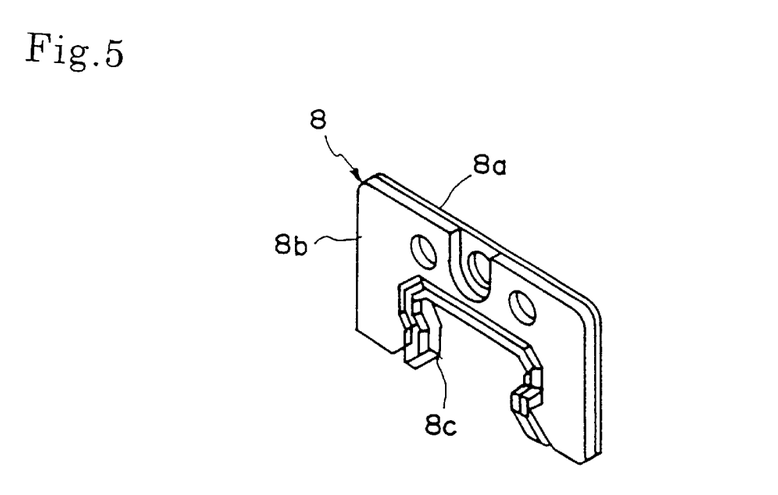
FIG. 5 is a perspective view showing an end seal of FIG. 1 or 2.

As shown in FIG. 5, the end seal 8 used for this embodiment comprises a stiff main body 8a made of a metallic plate having a stiffness, an elastic main body 8b bonded to the surface of the main body 8a and made of a rubber plate having an elasticity, and a seal lip portion 8c formed integrally of the same material as the elastic main body 8b and to be in firm contact with the surface of the track rail 1.

Thus, according to the dust preventing structure (dust preventing member 9) of this embodiment, even if use of coolant is required or this is used under a severe condition in which dirt, dust, wooden pieces, cutting powder or the like falls thereon, before the end seal 8 comes into a contact with the surface of the track rail 1 or lubricant is supplied to the ball rolling groove 1a of the track rail 1 by the lubricant supplying member 7, foreign matter such as coolant and dust adhering to the surface of the track rail 1 is removed securely by the scraper member 17 and the three elastic members 16a, 16b, 16c constituting the lubricant supplying portion. Further, grease 19 loaded in the lubricant pocket (corresponds to the concave groove portion 18) is applied to the track rail 1 so as to form lubricant film having an excellent anti-coolant performance. As a result, a friction between the surface of the track rail 1 and the seal lip portion 8c of the end seal 8 can be reduced as much as possible. Thus, air tightness between the surface of the track rail 1 and seal lip portion 8c of the end seal 8 can be maintained in a long term. Consequently, a reduction of lubricity caused due to a shortage of lubricant supplied from the lubricant supplying member 7 to the ball rolling groove 1a of the track rail 1 or lubricant or grease supplied to the infinite circulation path for the balls 3 via the supply nipple 12 can be prevented in a long term.

About this point, durability test was performed under a condition in which coolant was used regarding the embodiment in which the lubricant pocket (corresponds to the concave groove portion 18) was filled with grease 19 and a comparative example in which no grease 19 is loaded in the lubricant pocket (corresponds to the concave groove portion 18). As a result, in this embodiment, at an end portion of each of three the elastic members 16a, 16b, 16c constituting the lubricant supplying portion while in firm contact with the surface of the track rail 1, a durability seven times the comparative example was indicated and even if an impact applied to the seal lip portion 8c of the end seal 8 in firm contact with the surface of the track rail 1 exceeds seven times the comparative example, any damage was not noticed, thereby indicating that a durability seven times the comparative example was exerted.

Figure 6:
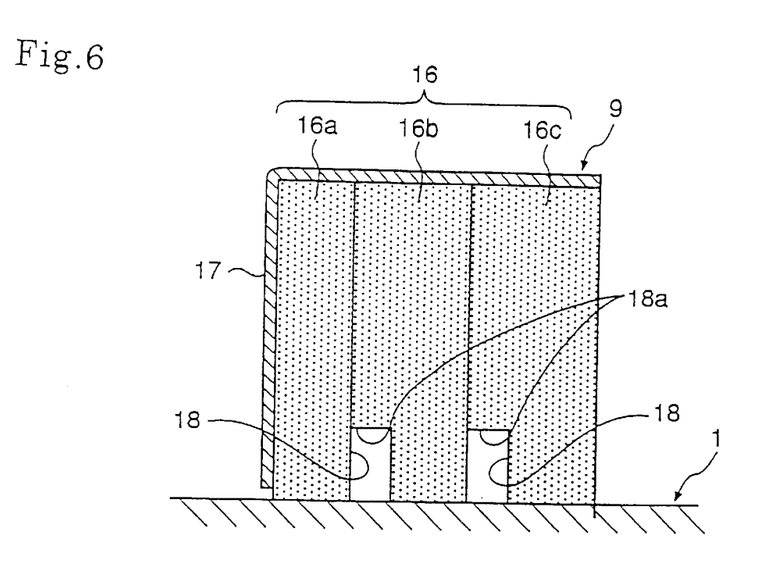
FIG. 6 is a sectional explanatory view showing a dust preventing structure (dust preventing member) according to a modification of the present invention.

FIG. 6 shows a modification of the dust preventing structure (dust preventing member 9) of the present invention. Different from the above embodiment, the lubricant pocket forming member 16 comprises three elastic members 16a, 16b, 16c made of continuously foamed polyurethanefoam and soaked with lubricant so as to form a lubricant supplying portion. A cutout portion 18a is formed in the two elastic members 16b, 16c of them and when three elastic members 16a, 16b, 16c are overlaid, a predetermined concave groove portion 18 is formed.

In this modification, the lubricant pocket forming member 16 is entirely formed of continuously foamed polyurethanefoam, so that the amount of lubricant which it can be soaked with increases thereby lubricant being supplied in a longer term.

Figure 7:
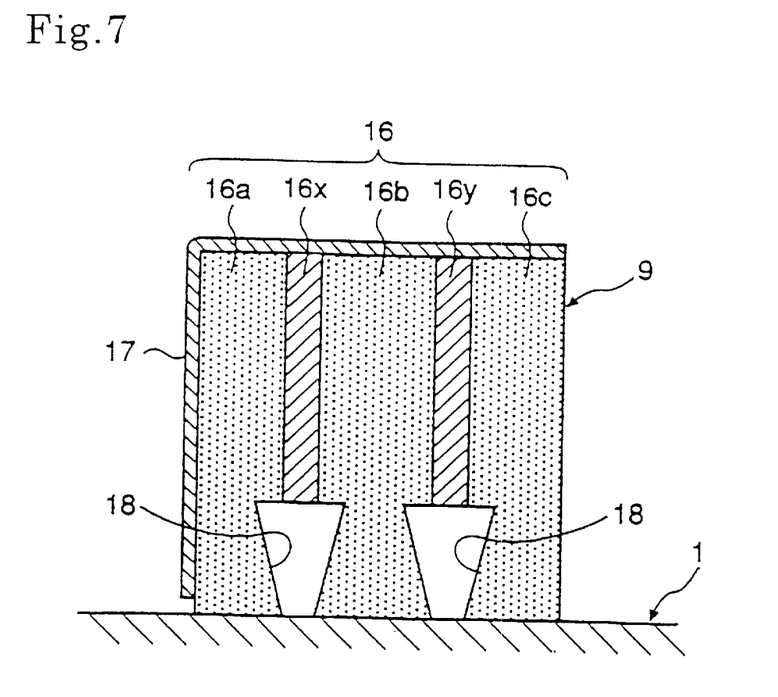
FIG. 7 is a sectional explanatory view showing a dust preventing structure (dust preventing member) according to other modification of the present invention.

FIG. 7 shows other modification of the dust preventing structure (dust preventing member 9) of the present invention. Different from the above embodiment, a cutout portion 18a having a triangular section is formed on a single side of a bottom of each of the two elastic members 16a, 16b located on both sides and a cutout portion 18a having a triangular section is formed on each of both sides of a bottom of the elastic member 16b located in the center. When the spacer members 16x, 16y are overlaid and sandwiched between the elastic members 16a, 16b, 16c, the concave groove portions 18 each having a section of inverse trapezoidal shape are formed with the elastic members 16a, 16b, 16c and the spacer members 16x, 16y.

In this modification, the formed concave groove portion 18 has a section of inverse trapezoidal shape and therefore the shape of a section of the lubricant pocket formed with the surface of the track rail 1 is inverse trapezoidal. As a result, the capacity of the lubricant pocket relative to the size of a coating surface (that is, opening portion of the concave groove portion 18) of lubricant can be increased, so that the amount of lubricant which can be loaded in this lubricant pocket increases thereby making it possible to supply the lubricant in a longer period.

Figure 8:
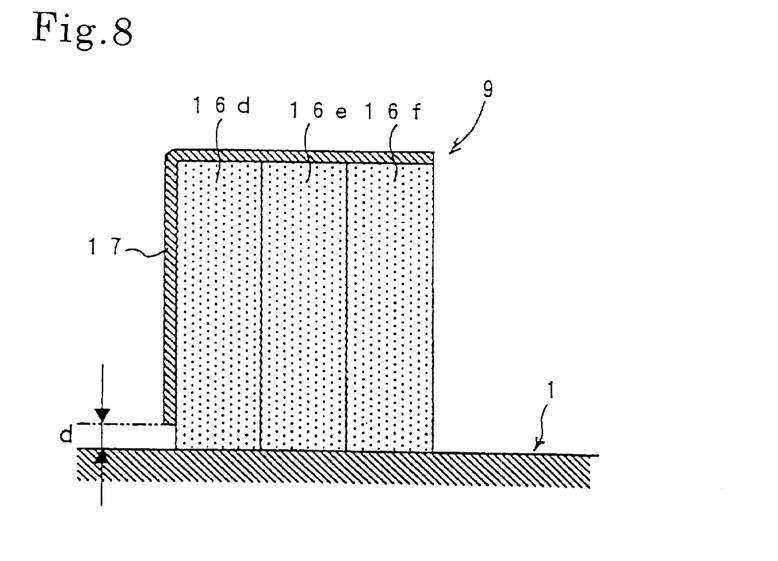
FIG. 8 is a sectional explanatory view showing a dust preventing structure (dust preventing member) according to still other modification of the present invention.

FIG. 8 shows other modification of the dust preventing structure (dust preventing member 9) of the present invention. In this modification, the dust preventing member 9 comprises three elastic members 16d, 16e, 16f made of elastic materials not soaked with lubricant unlike the aforementioned elastic members 16a, 16b, 16c soaked with lubricant and the scraper member 17 mounted on the sliding base 2 such that it holds these three elastic members 16d, 16e, 16f between the scraper member 17 and the sliding base 2 with the lubricant supplying member 7 and end seal 8 while maintaining a slight gap with respect to the track rail 1.

In this modification also, the dust preventing member 9 prevents an invasion of dust or dirt into the sliding base 2 because the elastic members 16d, 16e, 16f are overlaid on the track shaft 1 in the length direction thereof such that they are in firm contact with the track shaft 1, thereby achieving a smooth reciprocating motion of the sliding base 2 relative to the track rail 1. Further, lubricant supplied to the track rail 1 by the aforementioned lubricant supplying member 7 or other means is held effectively, thereby maintaining a smooth reciprocating motion of the sliding base 2 with respect to the track rail 1 in a long period.

Although in the modification of FIG. 8, all the three elastic members 16d, 16e, 16f constituting the dust preventing member 9 are composed of elastic members not soaked with lubricant, it is permissible to replace one or two of them with the aforementioned elastic members 16a, 16b, 16c soaked with lubricant so that the elastic members soaked with lubricant and not soaked with lubricant are combined, considering a use environment of a guide unit to which the dust preventing structure of the present invention is applied.

What is claimed is:

1. A guide unit comprising:
   a track shaft having a rolling groove of a rolling body,
   a sliding member engaged with the track shaft via the rolling body and moved relative to the track shaft,
   a pair of end seals mounted to both ends in a traveling direction of the sliding member, having a seal lip portion being in firm contact with a surface of the track shaft, and
   a pair of dust preventing members mounted to both ends in the traveling direction of the sliding member and being on an outer side of the end seals, for removing foreign matters adhering to the track shaft forwardly to the end seal,
   wherein the dust preventing member comprises elastic members, each elastic member being made of a continuously foamed body for holding lubricant, in firm contact with a surface of said track shaft, said elastic members are overlaid in a longitudinal direction of said track shaft, and a spacer member interposed between the elastic members, wherein the spacer member is not in contact with the surface of the track shaft, and wherein each elastic member is plate shaped and has an end surface opposite to said track shaft, said end surface of each elastic member having a planar surface substantially parallel to the surface of the track shaft, and wherein said track shaft contacts an entire surface area of said end surface of each elastic member.

2. A guide unit according to claim 1, wherein the continuous foam is a urethane foam.

3. A guide unit according to claim 1, wherein the spacer member is made of a metallic plate.

4. A guide unit according to claim 1, wherein a scraper member is mounted on the sliding member with a predetermined gap relative to the track shaft for scraping off foreign matters adhering to the track shaft in accordance with a relative movement between the sliding member and the track shaft, and the elastic members are sandwiched and held between the scraper member and the sliding member.

5. A guide unit according to claim 2, wherein a scraper member is mounted on the sliding member with a predetermined gap relative to the track shaft for scraping off foreign matters adhering to the track shaft in accordance with a relative movement between the sliding member and the track shaft, and the elastic members are sandwiched and held between the scraper member and the sliding member.

* * * * *